United States Patent
Yanagisawa et al.

(10) Patent No.: US 6,707,781 B2
(45) Date of Patent: Mar. 16, 2004

(54) DISC CHANGER COMPRISING MECHANISM TO PREVENT UNFAVORABLE NOISE

(75) Inventors: Tatsuya Yanagisawa, Kawagoe (JP);
Kiyohito Kajihara, Kawagoe (JP);
Kiyofumi Sugimoto, Kawagoe (JP);
Satoru Anada, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 470 days.

(21) Appl. No.: 09/821,083

(22) Filed: Mar. 30, 2001

(65) Prior Publication Data

US 2001/0026527 A1 Oct. 4, 2001

(30) Foreign Application Priority Data

Mar. 30, 2000 (JP) ..................... P2000-093138

(51) Int. Cl.$^7$ ............................................. G11B 17/04
(52) U.S. Cl. .................................................. 369/191
(58) Field of Search ........................... 369/191, 30.77, 369/30.78

(56) References Cited

U.S. PATENT DOCUMENTS 4,680,748 A * 7/1987 Kobayashi ............... 369/77.1
5,197,056 A * 3/1993 Van Heusden et al. .. 369/30.86
5,524,003 A * 6/1996 Tsuchiya ..................... 369/191

FOREIGN PATENT DOCUMENTS

JP    10021630 A * 1/1998 ........... G11B/17/30

* cited by examiner

*Primary Examiner*—David Davis
(74) *Attorney, Agent, or Firm*—Sughrue Mion, PLLC (57) ABSTRACT

A disc changer comprises a disc storage device, a disc reproduction device and an elevation device. The disc storage device is capable of storing discs to be arranged in a apparatus main body in a stacked state. The disc reproduction device has a carriage chassis on which the first components comprising a turntable and a pickup are mounted. The elevation device is capable of elevating the disc reproduction device in the stacking direction of the disc stored in the disc storage device. A force application device is provided at a position in abutment with the carriage chassis so as to apply force to the carriage chassis, when the disc reproduction device is moved to a standby position by the elevation device. The force is applied in the opposite direction to a movement direction of the disc reproduction device toward the standby position.

2 Claims, 11 Drawing Sheets

PRIOR ART

DISC CHANGER COMPRISING MECHANISM TO PREVENT UNFAVORABLE NOISE

BACKGROUND OF THE INVENTION

1. Field of the Invention

The present invention relates to a disc changer comprising a simple mechanism for preventing an occurrence of abnormal noise caused by vibration.

2. Description of the Related Art

A disc changer disclosed in Japanese Patent Application Laid-open No. 10-21630 previously filed by the Applicant comprises: a disc storage device removably inserted into an apparatus main body while holding a plurality of discs arranged in a stacked state; a disc reproduction device comprising a clamper for holding a disc from above, a turn table on which the disc is placed, and a pickup that is movable in a radial direction of the disc to read information recorded in the disc; and an elevation device for elevating the disc reproduction device in the stacking direction of the discs stored in the disc storage device.

The disc changer will be described with reference to FIG. 10 and FIG. 11.

Figure 10:
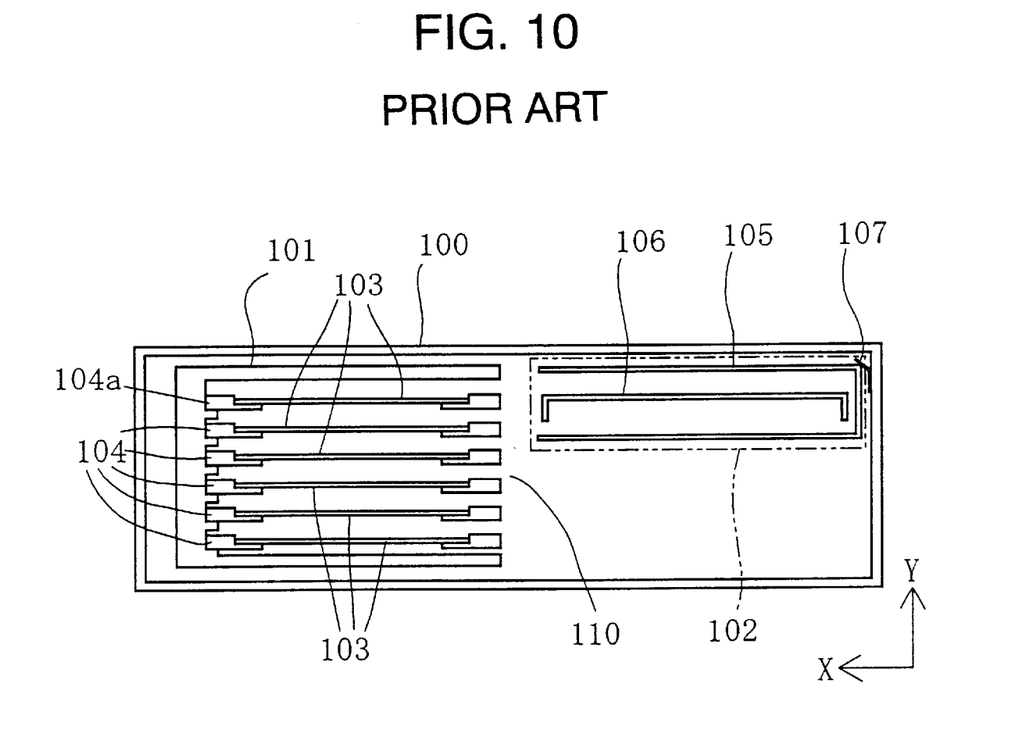
FIG. 10 is a schematic front view schematically illustrating the internal structure of the conventional disc changer.

As shown in FIG. 10, the disc changer comprises a casing 100 of the apparatus main body so that a magazine 101 serving as a disc storage device is stored in a space at the left-hand portion of the casing 100. The magazine 101 has trays 104 on which a plurality of discs 103 can be placed from an opening 110 to store them in these trays 104 and removed therefrom. The magazine 101 can be loaded into the casing 100 so that the opening 110 is directed to an X-axis direction (i.e., the transverse direction of the disc changer) and unloaded therefrom by means of a magazine eject mechanism (not shown). The loading and unloading direction relative to the casing 100 of the magazine 101 include a Z direction (i.e., the longitudinal direction of the disc changer) that extends vertically to both of the X-axis direction and the Y-axis direction (i.e., the vertical direction of the disc exchanger).

A disc reproduction device 102 comprises a stage chassis 105 on which a clamper is mounted; and a carriage chassis 106 on which a turntable and a pickup are mounted. The stage chassis 105 can be elevated together with the carriage chassis 106 in the Y-axis direction. Although a mechanism for the elevation is not shown, for example, slide members are disposed respectively on both front and rear faces in the Z direction of the casing 100. These slide members are constructed to be slidably engaged with, guide pins protruded from the stage chassis 105 and the carriage chassis 106, respectively. When the slide members moves relatively in the X-axis direction along both first and rear faces of the casing 100, the disc reproduction device 102 is elevated in the Y-axis direction. By the elevation mechanism, the disc reproduction device 102 moves to a position at which a disc 103 selected by a user is stored.

The disc reproduction device comprises a disc transfer mechanism (not shown). The disc transfer mechanism is engaged with the tray 104 for the selected disc 103 so as to draw the tray 104 to a disc reproduction position. The disc reproduction device 102 reproduces the disc 103 on the tray 104, which is drawn from the magazine 101 to the disc reproduction position.

In the thus constructed disc changer, for example, when a user presses a magazine eject button or the like (not shown) provided on the apparatus main body, the elevation mechanism moves the disc reproduction device 102 to the standby position, i.e., the storage position of the disc 103 placed on the tray 104a at the top stage of the magazine 101 shown in FIG. 10. After the disc reproduction position coincides with the disc storage position, the magazine 101 is ejected out of the casing 100 in the Z direction.

In the thus constructed disc changer, when the magazine 101 is ejected from the casing 100, the disc reproduction device 102 vibrates under the influence of external vibration, and abnormal noise may be generated. Conventionally, as a device for preventing an occurrence of such abnormal noise, an elastic member is provided on each of the casing 100 and the carriage chassis 106. The elastic member applies an elastic force to the stage chassis 105 and the carriage chassis 106, thereby attempting to prevent vibration.

A device for preventing the occurrence of an abnormal noise will be described with reference to FIG. 10 and FIG. 11.

As shown in FIG. 10, a leaf spring 107 serving as the elastic member is provided at the upper part of the casing 100 that corresponds to a position in abutment with the top face end of the stage chassis 105 when the disc reproduction device 102 moves to the standby position. When the disc reproduction device 102 is moved to the standby position by means of the elevation device, the leaf spring 107 comes into contact with the stage chassis 105, thereby applying an elastic force to the stage chassis 105 in the Y-axis direction.

Figure 11:
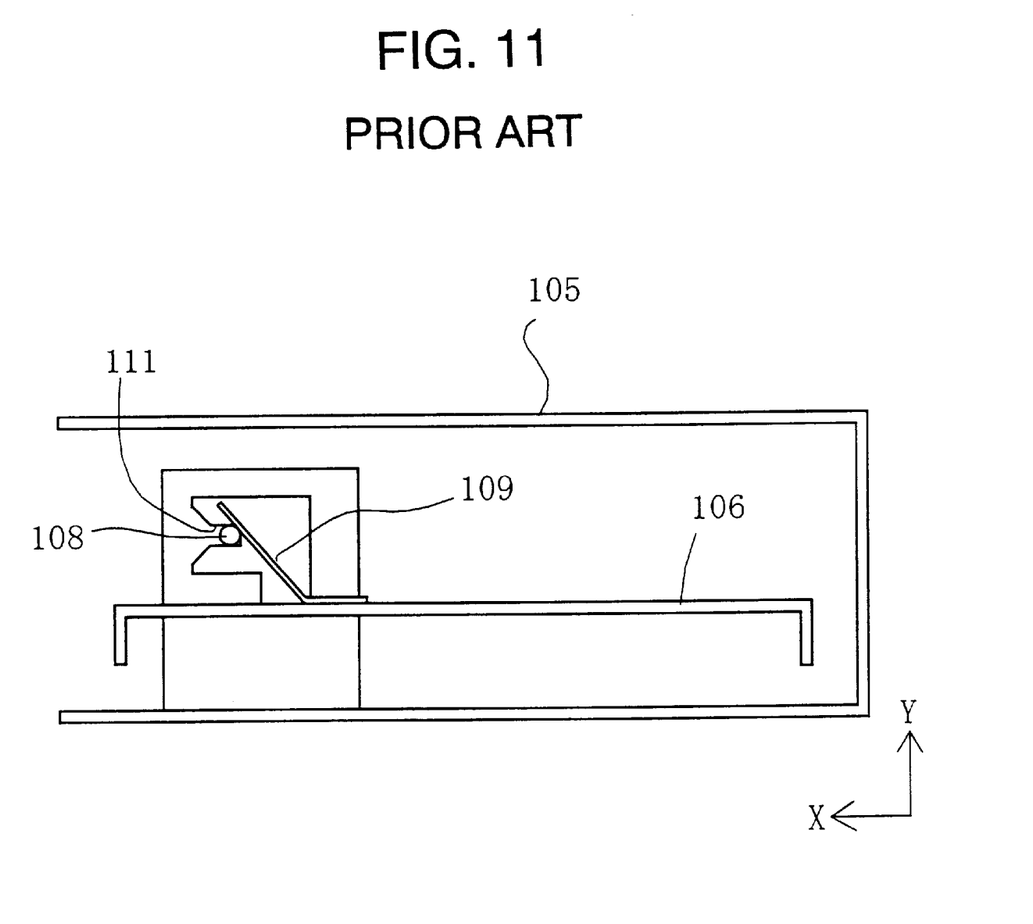
FIG. 11 is a schematic front view illustrating a disc reproduction device in the conventional disc changer.

In addition, as shown in FIG. 11, a leaf spring 109 serving as the elastic member is provided on the carriage chassis 106, and an engagement pin 108, which can come into contact with the leaf spring 109 is provided on the disc transfer mechanism (not shown). The engagement pin 108 serves to make a positional decision between a disc reproduction position of the disc reproduction device 102 positioned by the elevation device and the disc storage position of the disc 103 stored in the magazine 101. When the disc transfer mechanism moves in the X-axis direction in order to draw the tray 104 after the disc reproduction device 102 has been positioned by means of the elevation device, the engagement pin 108 moves in the same direction accordingly. Then, the engagement pin 108 is engaged with a guide hole 111 provided at the carriage chassis 106 to make a positional decision, and the leaf spring 109 is pressed in the same direction, whereby the carriage chassis 106 and the disc transfer mechanism turn into a united body. The disc transfer mechanism draws the tray 104 to the disc reproduction position.

More specifically, when the disc reproduction device 102 moves to the standby position described above, the leaf spring 107 shown in FIG. 10 applies an elastic force to the stage chassis 105 in the Y-axis direction. The leaf spring 109 shown in FIG. 11 applied an elastic force to the engagement pin 108 engaged with the guide hole 111 in order to make a positional decision between the disc storage position of the disc 103 placed on the tray 104 at the top stage of the magazine 101 and the disc reproduction position. By both of the above-mentioned elastic forces, the stage chassis 105 and carriage chassis 106 are stationarily held on the casing 100. In this manner, even if the disc reproduction device 102 is subjected to external vibration, the device does not generate abnormal noise. At the standby position, the disc transfer mechanism does not draw the tray 104.

However, in the conventional construction described above, the engagement pin 108 is pressed against the leaf spring 109, generating an elastic force in the X-axis direction between the former and the latter every time the disc reproduction device 102 is positioned by means of the elevation mechanism at the disc storage position of the disc stored in the magazine 101. Thus, the elastic force of the leaf spring 109 for preventing an occurrence of abnormal noise is applied to the carriage chassis 106 every time the disc is transferred. Therefore, there is a problem that a large driving force must be applied to the disc transfer mechanism in proportion to the applied elastic force. Further, the engaging pin 108 essentially serves to make a positional decision between the disc storage position of the disc stored in the magazine 101 and the disc reproduction position of the disc reproduction device 102. However, there is a problem that the engagement pin 108 urges the leaf spring 109, thereby causing displacement between the disc storage position and the disc reproduction position.

SUMMARY OF THE INVENTION

An object of the present invention is to provide a disc changer, which permits to solve the foregoing problems.

In order to solve the foregoing problems, according to the first aspect of the present invention, there is provided a disc changer comprising: a disc storage device capable of storing a plurality of discs to be arranged in a apparatus main body in a stacked state; a disc reproduction device having a carriage chassis on which first components comprising a turn table and a pickup are mounted; and an elevation device capable of elevating said disc reproduction device in a stacking direction of the disc stored in said disc storage device, wherein, a force application device is provided at a position in abutment with said carriage chassis so as to apply force to said carriage chassis, when the disc reproduction device is moved to a standby position by said elevation device, said force being applied in a direction opposite to a movement direction of said disc reproduction device toward said standby position.

According to a second aspect of the present invention, there is provided a disc changer of the first aspect, wherein said disc reproduction device has a stage chassis on which at least one second component comprising a clamper is mounted, and said disc reproduction device is stationarily held relative to said apparatus main body through transmission of said force caused by said force application device to said stage chassis, leading to application of said force to both of said carriage chassis and said stage chassis in the directions opposite to the movement direction of said disc reproduction device toward said standby position.

BRIEF DESCRIPTION OF THE DRAWINGS

FIGS. 1(A), 1(B), and 1(C) are front views each showing an outline of a disc changer according to the present invention, wherein FIG. 1(A) shows a state in which a disc reproduction device is set at a standby position, FIG. 1(B) shows a state in which a disc is transferred to a reproduction position by disc carriage device, and FIG. 1(C) shows a state in which the disc reproduction device reproduces a disc;

DETAILED DESCRIPTION OF THE PREFERRED EMBODIMENTS

Preferred embodiments of the present invention will be described below with reference to FIG. 1 to FIG. 9.

First, a schematic structure of the disc changer will be described with reference to FIGS. 1(A) to 1(C).

As shown in FIG. 1, the disc changer comprises: a magazine 2 serving as a disc storage device and a disc reproduction device 3, which are received in a casing 1 of a disc changer apparatus main body. The magazine and the reproduction device are placed along the X-axis direction (for example, transverse direction of the disc changer).

The magazine 2 has a plurality of trays 5 in its frame, and a disc 4 is placed on each tray 5. In this manner, for example, six discs 5 are stored to be arranged in a stacked state in the Y-axis direction in the casing 1 (for example, vertical direction of the disc changer). In addition, the magazine 2 can be loaded into the casing 1 and unloaded therefrom. For example, a user presses a magazine eject button or the like provided on the apparatus main body, whereby the magazine is ejected in the Z direction (for example, the longitudinal direction of the disc changer, extending vertically to the X-axis and Y-axis directions). More specifically, by carrying out a push operation of the magazine eject button or the like, a magazine eject mechanism (not shown) is driven, and the magazine 2 is pushed out of the casing 1 in the Z direction. The disc 4 stored in the magazine 2 can be pulled out of an opening 11 of the magazine or replaced with another disc by ejecting the magazine 2 from the casing 1. After the user has replaced the disc 4, the magazine 2 can be placed in a predetermined position in the casing 1 again by pressing the magazine 2 into the casing 1 in the Z direction.

The disc reproduction device 3 comprises a stage chassis 7 on which a clamper 6 is mounted and a carriage chassis 9 on which a turn table 8 and a pickup 10 are mounted. The disc reproduction device 3 can be elevated in a stacking direction of the discs 4, i.e., in the Y-axis direction by means of an elevation device (described later) disposed in the casing so as to be placed in the storage position of the selected disc 4. In addition, the disc reproduction device 3 includes a disc transfer mechanism (not shown). The disc transfer mechanism engages with the tray 5 for the selected disc 4, so as to draw the tray 5 to the disc reproduction position. The disc reproduction position denotes a position at which the center of the disc 4 coincides with the centerline of the turntable 8. The disc transfer mechanism transfers the disc 4 from the disc storage position of the magazine 2 to the disc reproduction position of the disc reproduction device 3. In the disc reproduction device 3, the disc 4 transferred to the disc reproduction position is held between the clamper 6 and the turntable 8 by moving the carriage chassis 9 in the Y-axis direction. In addition to the turntable 8, the pickup is mounted on the carriage chassis 9. The pickup reproduces information recorded on the disc 103. A mechanism for clamping the disc 4 will be described later.

Here, a disc reproduction operation of the disc changer will be described with reference to FIG. 1.

Figure 1A:
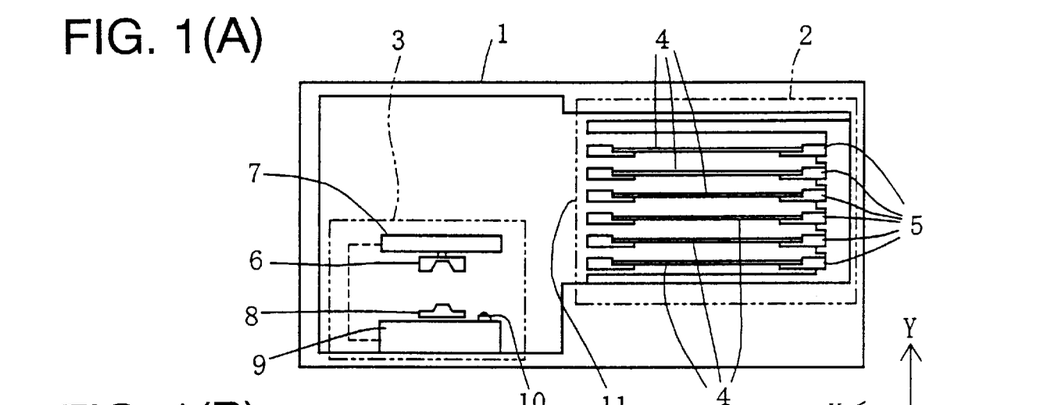
Figure 1B:
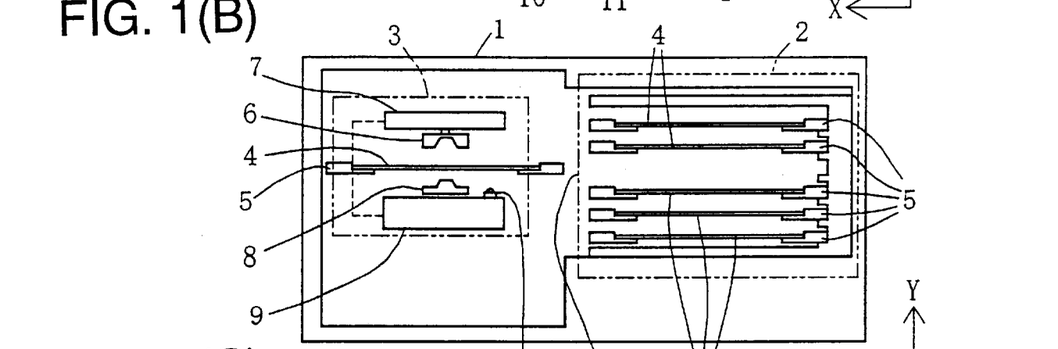

When the magazine 2 is ejected out of the casing 1, the disc reproduction device 3 is moved to the standby position shown in FIG. 1(A) by means of the elevation device provided on the casing 1, and waits for operation. The standby position of the disc reproduction device 3 is out of the disc reproduction position that corresponds to the storage position of the disc 4 stored in the magazine 2.

When the user makes a selection of a disc to be reproduced, and instructs reproduction, the elevation device moves the disc reproduction device 3 from the standby position shown in FIG. 1(A) to the Y-axis direction in order to make a positional decision between the disc reproduction position of the disc reproduction device 3 and the disc storage position at which the selected disc is stored. When the disc reproduction device 3 is placed in a prescribed position by means of the elevation device, the disc transfer mechanism pulls out the tray 5 to the disc reproduction device 3 side, and transfers the selected disc 4 to the disc reproduction position 3.

Figure 1C:
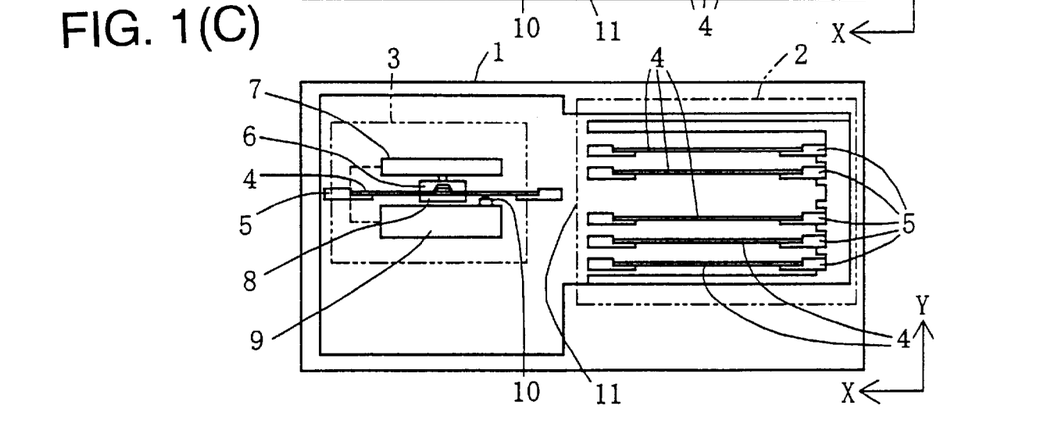

When the disc 4 is transferred to the disc reproduction position by means of the disc transfer mechanism, as shown in FIG. 1(C), the carriage chassis 9 of the disc reproduction device 3 moves in the Y-axis direction so that the disc 4 is held between the clamper 6 and the turn table 8. After completion of such a clamping operation, the driving force from a drive source (not shown) is applied to the disc 4 so as to rotate it. The pickup 10 reads and reproduced information from the rotating disc 4.

When reproduction of the disc 4 is completed, the disc 4, which is placed in the disc reproduction position is returned to its original disc storage position in the magazine 2 by means of the disc transfer mechanism. Further, when the user inputs a magazine eject command, the disc reproduction device 3 is moved to the standby position shown in FIG. 1(A) by means of the elevation device, and waits at the standby position until the next reproduction command is input.

Now, the structure of the elevation device of the disc reproduction device 3 and its operation will be described with reference to FIG. 2 to FIG. 4.

Figure 2:
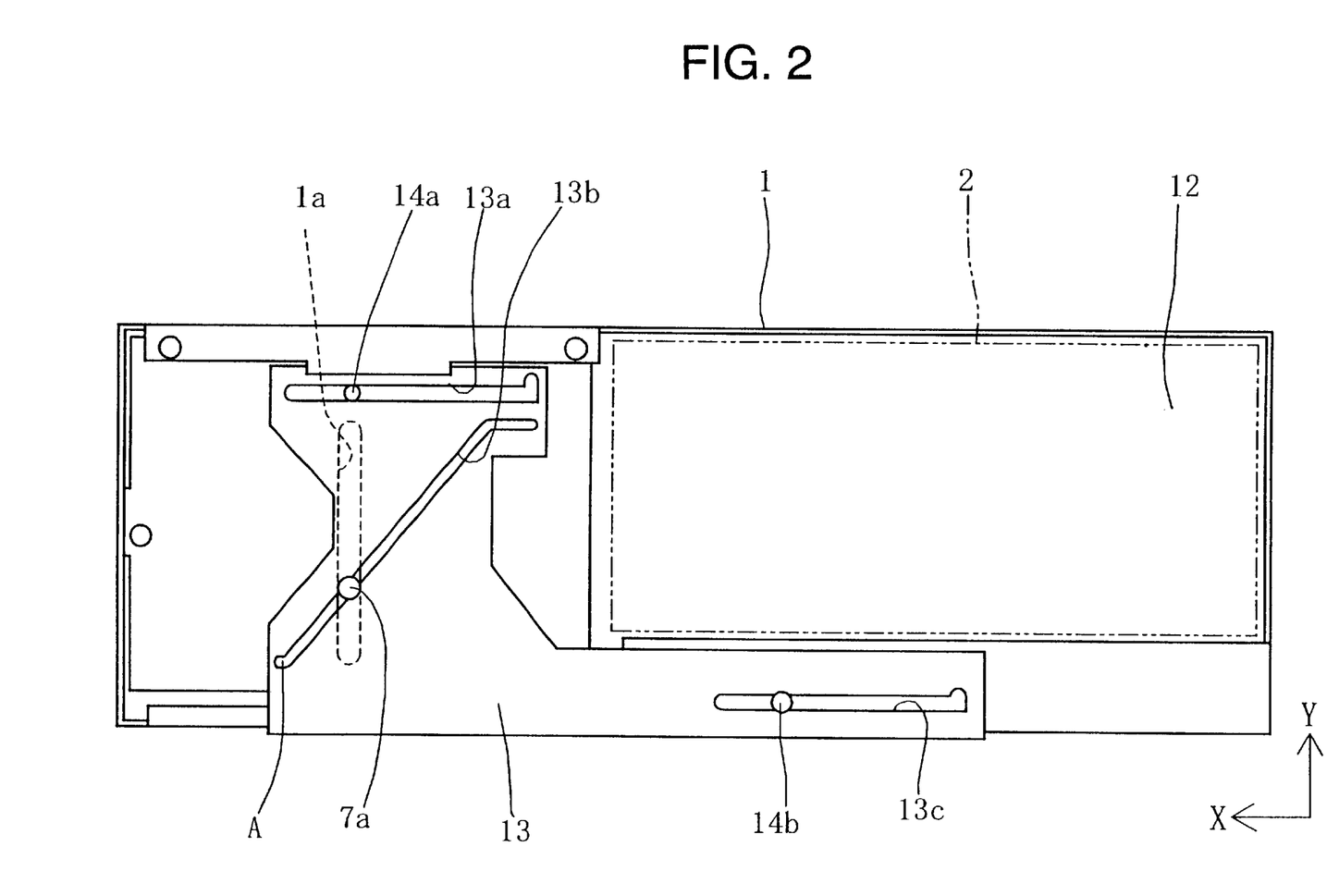
FIG. 2 is a front view of a casing of the disc changer.

As shown in FIG. 2, the casing 1 having a box-shape, of the disc changer, has an inlet opening 12 formed on the front side of the casing. The magazine 2 is inserted into the casing 1 from the inlet opening.

In addition, an elevation lever having an L-shape in its front view is disposed reciprocally in the X-axis direction on the front side of the casing 1. The elevation lever 13 has two guide holes 13a and 13c extending in the X-axis direction and an inclined hole 13b inclined at a predetermined angle. A guide pin 14a protruded from the casing 1 is engaged with the guide hole 13a, and the other similar guide pin 14b is slidably engaged with the guide hole 13c. Further, a guide pin 7a protruded from the front face of the stage chassis 7 is slidably engaged with the inclined hole 13b. In addition, the guide pin 7a is also slidably engaged with the guide hole 1a, which is provided in the front face of the casing 1 in the Y-axis direction. Further, the guide pin 7a is also engaged with a guide hole 60a formed in a clamping lever 60 placed in a space between the front face of the casing 1 described later and the elevation lever 13 (refer to FIG. 8 and FIG. 9).

Figure 3:
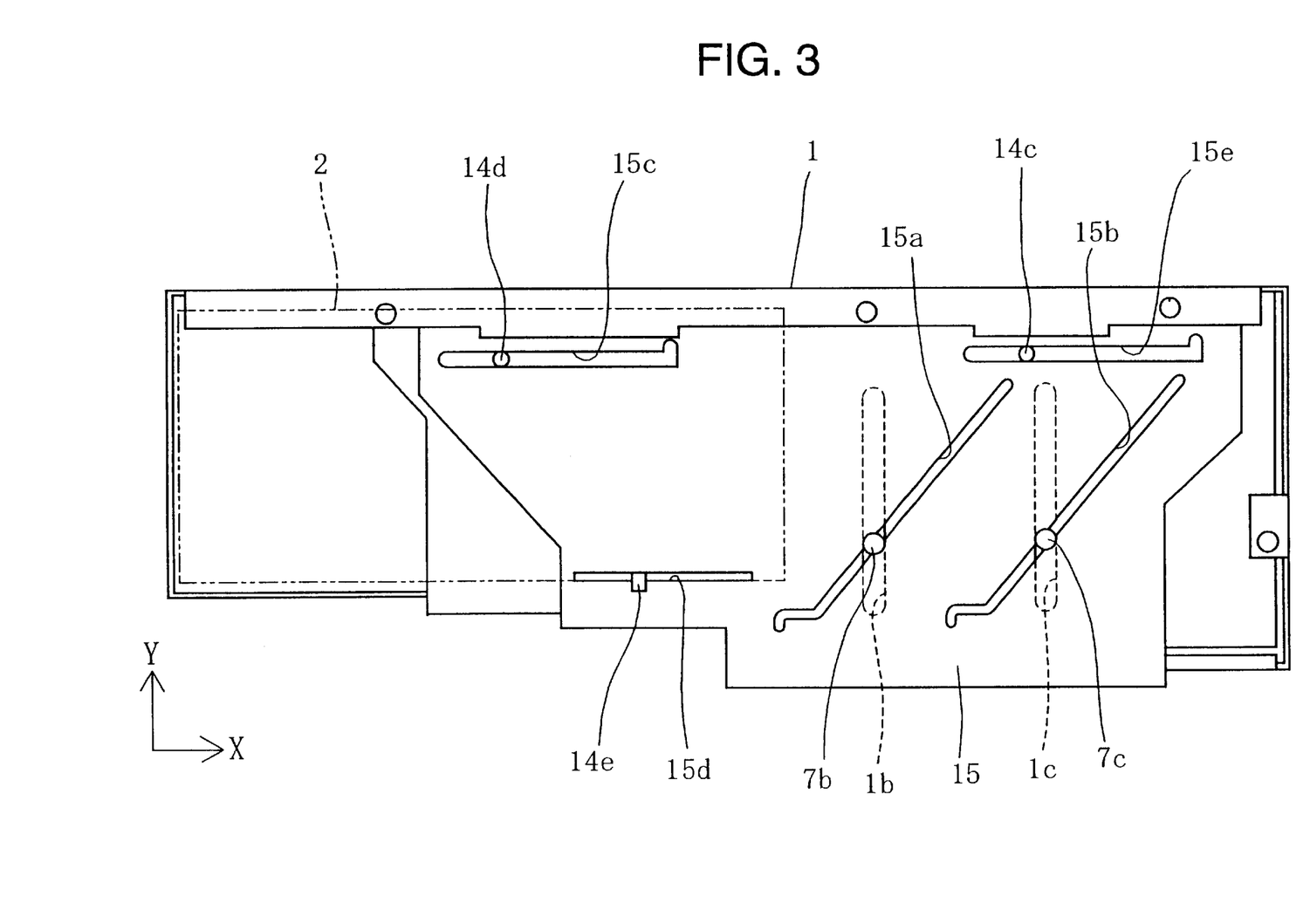
FIG. 3 is a rear view of the casing of the disc changer.

As shown in FIG. 3, a substantially rectangular elevation lever 15 is arranged reciprocally in the X-axis direction on the rear face of the casing 1. On the elevation lever 15, there are punched three guide holes 15a, 15d and 15e each extending in the X-axis direction and two inclined holes 15a and 15b each inclining at a predetermined angle. Guide pins 14d and 14c and an engagement hook 14e each protruded from the casing 1 are slidably engaged respectively with the guide holes 15c, 15e and 15d. Further, guide pins 7b and 7c each provided on the rear face of the stage chassis 7 are slidably engaged respectively with the inclined holes 15a and 15b, respectively. In addition, these two guide pins 7b and 7c are slidably engaged with two guide holes 1b and 1c provided at the rear face of the casing 1 in the Y-axis direction, respectively. Further, these guide pins are slidably engaged with a horizontal portion of the inclined hole 70c formed in a clamping lever 70, which is placed in a space between the casing 1 described later and the elevation lever 15, on the one hand, and a guide hole 70d, on the other hand, respectively (refer to FIG. 6).

Figure 4:
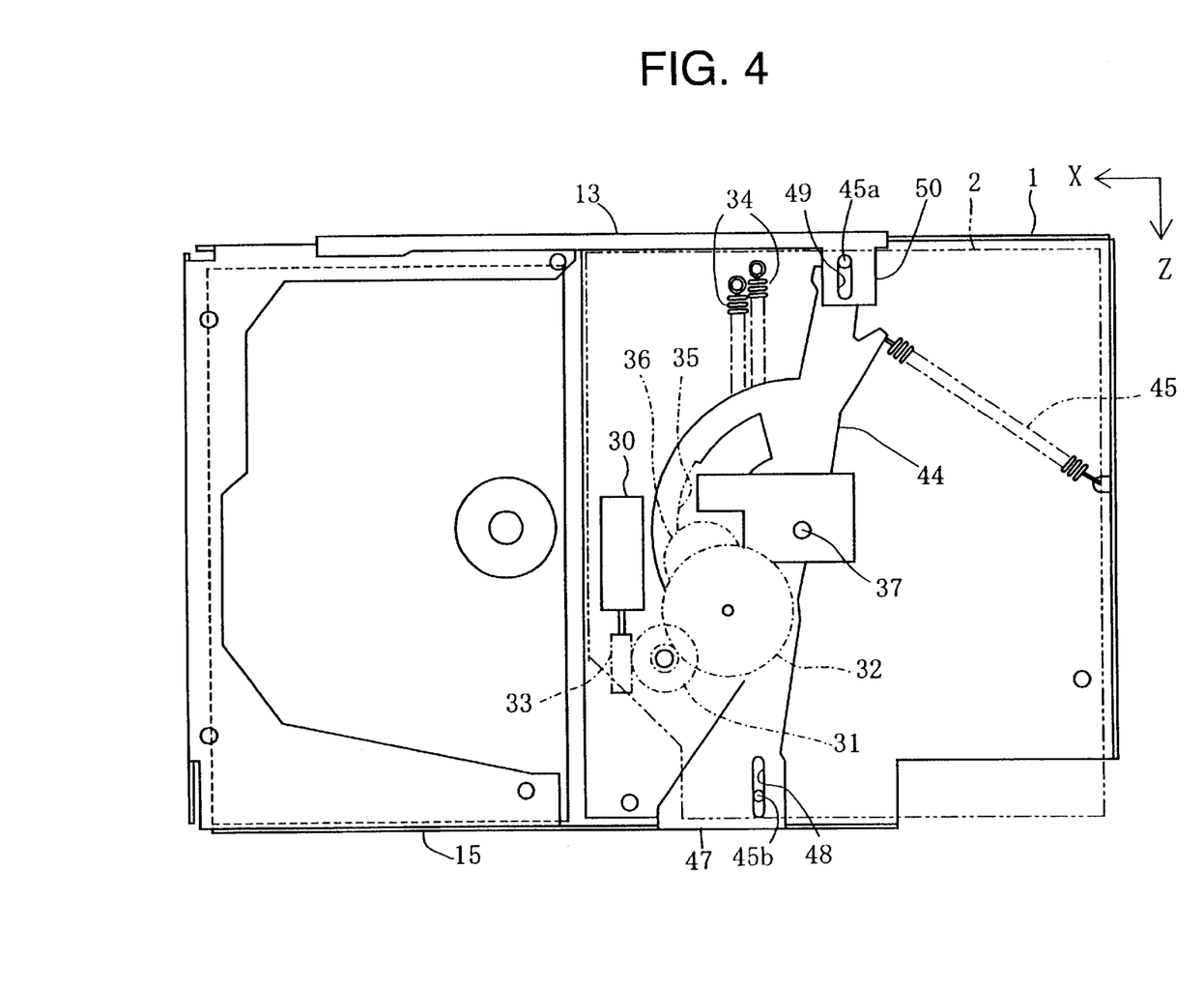
FIG. 4 is a bottom view of the casing of the disc changer.

As shown in FIG. 4, at the bottom of the casing 1, there is provided a driving mechanism for reciprocally moving elevation levers 13 and 15 along the X-axis direction. The driving mechanism comprises: a driving motor 30 serving as a driving source; a worm gear 33 fixed to the tip end of the rotary shaft of the driving motor 30; a dual gear 31 meshed with the worm gear 33; the other dual gears 32 and 36 for transmitting a driving force thereof; and a lever member 44 that swings around a pivot 37 and has a meshing portion 35 meshed with the second gear of the dual gear 36.

An elastic force, which is caused by a spring 45, is applied to the lever member 44 and has a function of swinging the lever member 44 clockwise in FIG. 4. In addition, an engagement pin 45a protruded at one end of the lever member 44 is engaged with a guide hole 49 punched at a bent portion 50 of the elevation lever 13. An engagement pin 45b protruded at the other end of the lever member 44 is engaged with a guide hole 48 punched at a bent portion 47 of the elevation lever 15. In this manner, when the lever member 44 is turned in the counterclockwise direction in the figure against the elastic force of the spring 45 by rotation of the driving motor 30, the elevation lever 13 moves to the left-hand side in the figure, and the elevation lever 15 moves to the right-hand side. Conversely, when the lever member 44 is turned in the clockwise direction under the function of the pulling force of the spring 45, the elevation lever 13 moves to the right-hand side in the figure, and the elevation lever 15 moves to the left-hand side. More specifically, the elevation levers 13 and 15 move in the opposite direction to each other, and the stage chassis 7 is moved to be elevated along the Y-axis direction by means of these elevation levers 13 and 15.

The stage chassis 7 and the carriage chassis 9 are coupled with each other via clamping levers 60 and 70. Thus, the stage chassis 7 is elevated together with the carriage chassis 9 by actuation of the elevation device.

The disc reproduction device 3 performs the following elevating operation by means of the elevation device having the above-described structure.

By the elevation levers 13 and 15 being subjected to the driving force of the driving motor 30, these elevation levers move reciprocally in a direction opposite to each other on the X-axis. In the stage chassis 7, the guide pins 7a, 7b and 7c provided on the front and rear faces of the stage chassis 7 are engaged into intersection portions between the guide holes 1a, 1b and 1c and the inclined holes 13b, 15a and 15b, respectively. Thus, along with reciprocal movement of the elevation levers 13 and 15, a relative displacement occurs at the intersection portions between the guide holes 1a, 1b and 1c and the inclined holes 13b, 15a and 15b, respectively. With the relative displacement, the position of the chassis is changed in the vertical direction, so as to face the disc storage position of the disc stored in the magazine 2.

More specifically, when the elevation lever 13 moves to the left-hand side in FIG. 2, and the position of the intersection portion between the guide hole 1a and the inclined hole 13b rises, the guide pin 7a rises accordingly. At the same time, the elevation lever 15 moves to the left-hand side in FIG. 3, the positions of the intersection portions between the guide holes 1b and 1c and the inclined holes 15a and 15b rise, and the guide pins 7b and 7c rise accordingly. In this manner, the stage chassis 7 rises. Conversely, when the elevation lever 13 moves to the left-hand side in FIG. 2, and the intersection portion between the guide hole 1a and the inclined hole 13b descends, the guide pin 7a descends accordingly. At the same time, when the elevation lever 15 moves to the right-hand side in FIG. 3, the intersection portions between the guide holes 1b and 1c and the inclined holes 15a and 15b descend, and the guide pins 7b and 7c descend accordingly. In this manner, the stage chassis 7 descends.

In the case where the disc reproduction device 3 moves to the standby state, the intersection portion between the guide hole 1a and the inclined hole 13b moves to its lowermost position. Accordingly, the guide pin 7a moves to its lowermost position, and is placed in the portion indicated by "A" shown in FIG. 2. In addition, the intersection portions between the guide hole 1b and 1c and the inclined holes 15a and 15b move to their lowermost positions, Accordingly, the guide pins 7a and 7c move to their lowermost positions, and the guide pins 7b and 7c are placed in horizontal portions of the inclined holes 15a and 15b. In this manner, the disc reproduction device 3 stops at the standby position.

Now, the structure of the clamping mechanism and its operation will be described with reference to FIG. 5 to FIG. 7.

Figure 5:
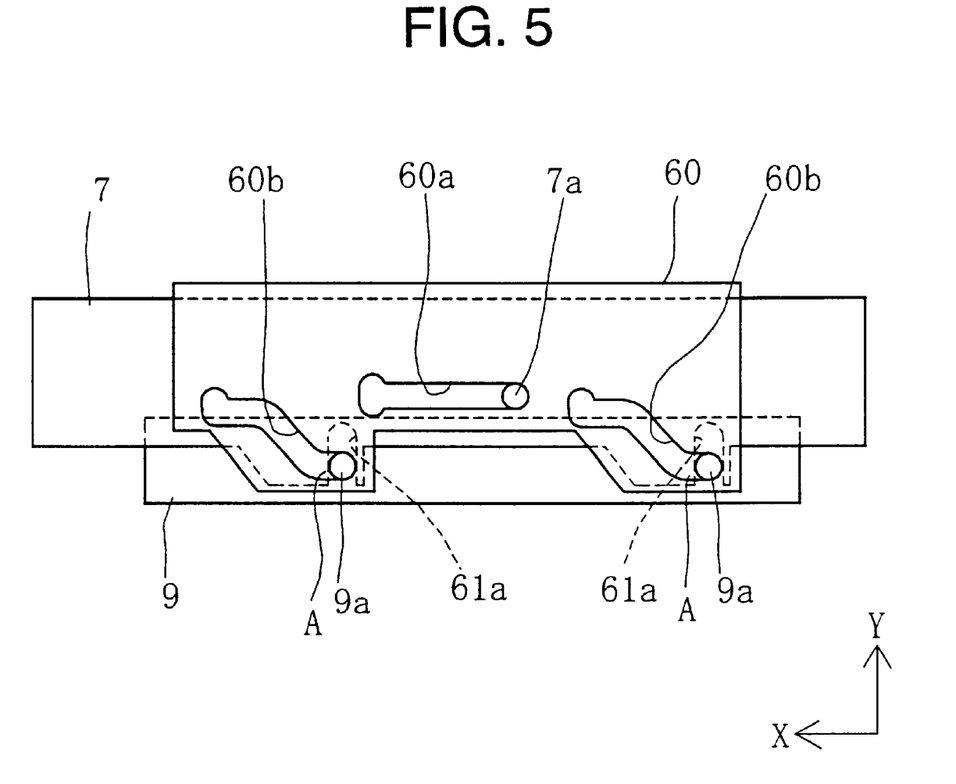
FIG. 5 is a front view of a clamping mechanism viewed from the front of the disc changer.

As shown in FIG. 5, on the front side of the stage chassis 7 and carriage chassis 9, a substantially rectangular clamping lever 60 is arranged reciprocally in the X-axis direction. On the clamping lever 60, there punched one guide hole 60a extending in the X-axis direction and two inclined holes 60b, 60b inclining at a predetermined angle. In addition, a guide pin 7a protruded from the front face of the stage chassis 7 is slidably engaged with the guide hole 60a. Further, guide pins 9a, 9a protruded from the front face of the carriage chassis 9 are slidably engaged with two inclined holes 60b, 60b, respectively. These guide pins 9a, 9a are slidably engaged with cutouts 61a, 61a extending in the Y-axis direction at the lower part of the front face of the stage chassis 7.

Figure 6:
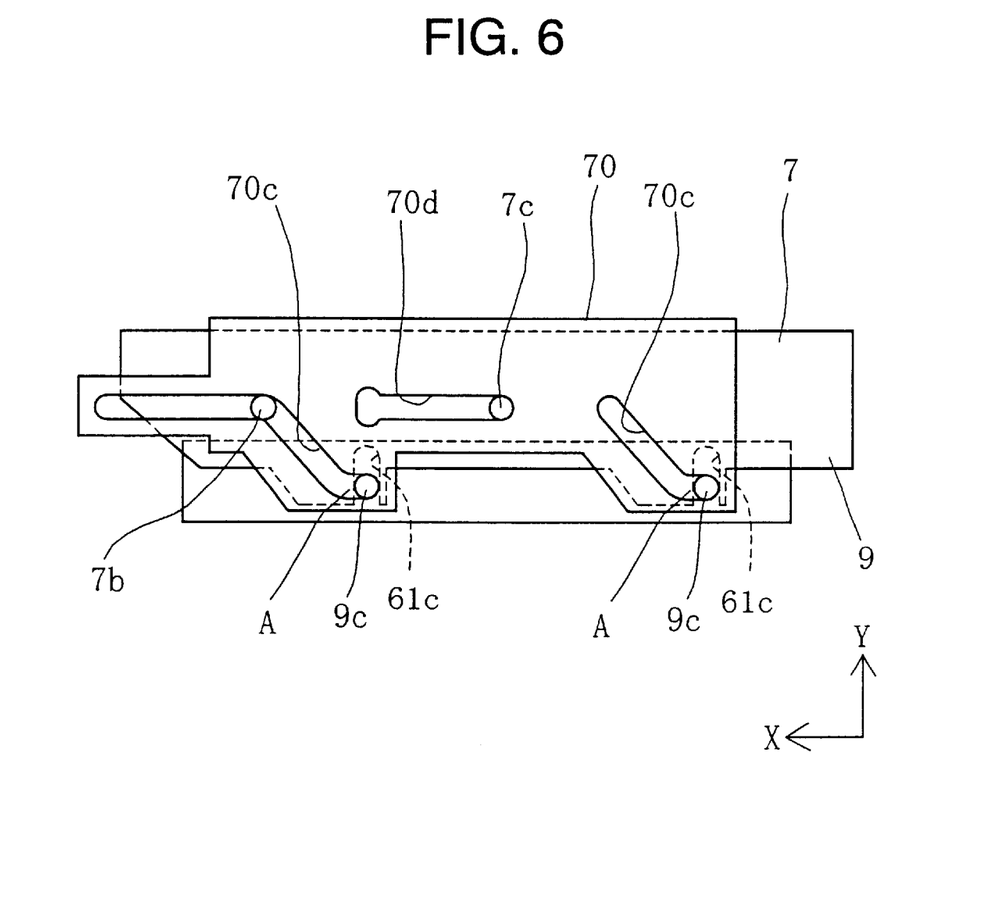
FIG. 6 is a rear view of the clamping mechanism viewed from the rear of the disc changer.

As shown in FIG. 6, at the rear face of the stage chassis 7 and the carriage chassis 9, a substantially rectangular clamping lever 70 is reciprocally arranged in the X-axis direction. On the clamping lever 70, there are punched one guide hole 70d extending in the X-axis direction and two inclined holes 70c, 70c inclining at a predetermined angle. In addition, a guide pin 7c protruded from the rear face of the stage chassis 7 is slidably engaged with a guide hole 70d. Further, guide pins 9c, 9c protruded from the rear face of the carriage chassis 9 are slidably engaged with the two inclined holes 70c, 70c, respectively. The guide pins 9c, 9c protruded from the rear face of the carriage chassis 9 are slidably engaged with cutouts 61c, 61c extending in the Y-axis direction formed at the lower part of the front face of the stage chassis 7, respectively.

In this manner, the guide pins 7a, 9a, 9a, 7c, 7b, 9c, 9c protruded from the front and rear faces of the stage chassis 7 and the carriage chassis 9 are engaged with the guide holes 60a, 60b, 60b, 70d, 70c, 70c protruded from the clamping levers 60 and 70. Thus, the stage chassis 7 and carriage chassis 9 are connected to each other by the clamping levers 60 and 70 and elevated in the Y-axis direction by means of the elevation device described above via the clamping levers 60 and 70.

Figure 7:
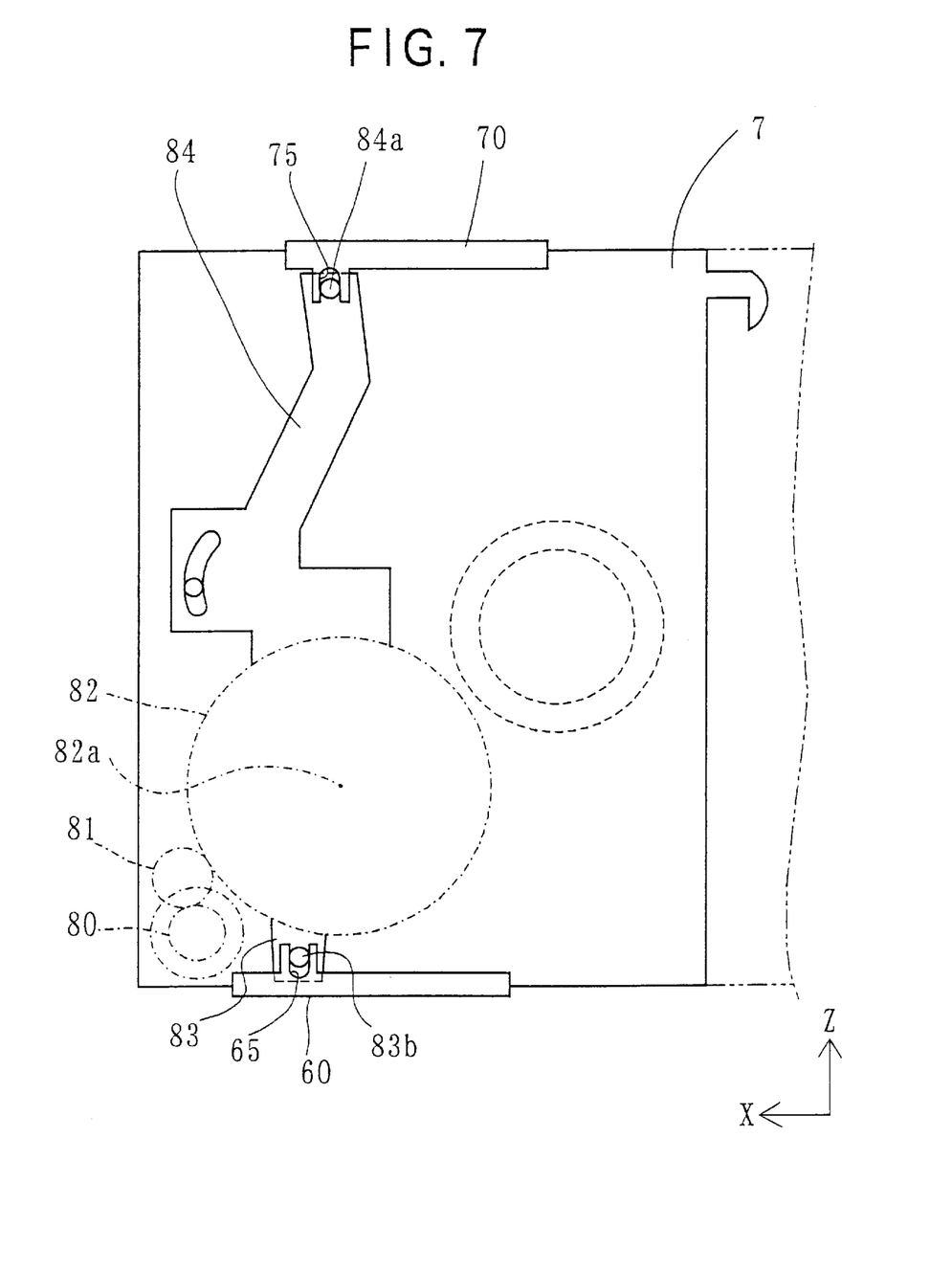
FIG. 7 is a plan view showing a driving portion of the clamping mechanism viewed from above a stage chassis.

As shown in FIG. 7, on the upper side of the stage chassis 7, there is provided a driving mechanism for reciprocally moving the clamping levers 60 and 70 along the X-axis direction. The driving mechanism comprises: a dual gear 80 for transmitting the driving force from a driving source (not shown); a small diameter gear 81 meshed with the dual gears 80; a large diameter gear 82 meshed with the small diameter gear 81; the first lever member 83 provided between the large diameter gear 82 and the stage chassis 7 so as to be reciprocally movable in the X-axis direction by the rotation of the large diameter gear 82; and the second lever member 84 provided between the large diameter gear 82 and the stage chassis 7 so as to be reciprocally movable in the X-axis direction by the rotation of the large diameter gear 82 in the same manner as the first lever member 83.

An engagement pin 83b protruded from the end of the first lever member 83 is engaged with a cutout 65 provided on the clamping lever 60. On the other hand, an engagement pin 84a protruded from the end of the second lever member 84 is engaged with a cutout 75 provided on the clamping lever 70.

In this manner, the driving force of a driving source (not shown) is transmitted from the dual gear 80 to the large diameter gear 82 via the small diameter gear 81. When the large diameter gear 82 rotates counterclockwise around the shaft 82a in FIG. 7, the first lever member 83 moves in the right-hand direction in FIG. 7, while the second lever member 84 moves in the left-hand direction in the same figure. As a result, the clamp levers 60 and 70 also follow the first and second lever members 83 and 84, respectively, to move in the opposite direction to each other.

On the other hand, when the large diameter gear 82 rotates clockwise around the shaft 82a in FIG. 7, the first lever member 83 moves in the left-hand direction in FIG. 7, while the second lever member 84 moves in the right-hand direction in the same figure. As a result, the clamp levers 60 and 70 also follow the first and second lever members 83 and 84, respectively, to move in the opposite direction to each other. The carriage chassis 9 is moved to be elevated along the Y-axis direction by means of the clamping levers 60 and 70 moving reciprocally in a direction opposite to each other. The turntable 8 clamps the disc 4 set at the disc reproduction position together with the clamper 6 of the stage chassis 7.

The clamping mechanism having the structure described above performs the following clamping operation.

The guide pins 9a, 9b and 9c are engaged with intersection portions between the cutouts 61a, 61a, 61c, 61c and the inclined holes 60b, 60b, 70c, 70c so that the carriage chassis 9 is slidably supported by the clamping levers 60 and 70. Thus, when the clamping levers 60 and 70 move reciprocally in the X-axis direction by the driving force of a driving source (not shown), the carriage chassis moves in the Y-axis direction accordingly.

More specifically, when the clamping lever 60 moves to the right-hand side in FIG. 5, the positions of the intersection portions between the cutouts 61a, 61a and the inclined holes 60b, 60 rise, and the guide pins 9a, 9a rise accordingly. At the same time, the clamping lever 70 moves to the left-hand side in FIG. 6, the positions of the intersection portions between the cutouts 61c, 61c and the inclined holes 70c, 70c rise, and the guide pins 9c, 9c rise accordingly. In this manner, the carriage chassis 9 rises, and a disc set at the disc reproduction position is clamped by the turntable 8 and clamper 6.

In addition, when the clamping lever 60 moves to the left-hand side in FIG. 5, the positions of the intersection portions between the cutouts 61a, 61a and the inclined holes 60b, 60b descend, and the guide pins 9a, 9a descend accordingly. At the same time, the clamping lever 70 moves to the left-hand side in FIG. 6, the positions of the intersection portions between the cutouts 61c, 61c and the inclined holes 70c, 70c descend, and the guide pins 9c, 9c descend accordingly. In this manner, the carriage chassis 9 descend, and the clamped state of the disc set at the disc reproduction position is released.

In the case where the disc reproduction device 3 moves to the standby position (refer to FIG. 1(A)), the positions of the intersection portions between the cutouts 61a, 61a and the inclined holes 60b, 60b move to their lowermost positions. Accordingly, the guide pins 9a, 9a also move to their lowermost positions, and are placed in portions (i.e., the horizontal portions) indicated by "A" shown in FIG. 5. In addition, the positions of the intersection portions between the cutouts 61c, 61c and the inclined holes 70c, 70c move to their lowermost positions. Accordingly, the guide pins 9c, 9c move to their lowermost positions, and are placed in positions (i.e., the horizontal portions) indicated by "A" shown in FIG. 6. In this manner, the clamping levers 60 and 70 keep the stage chassis 7 and carriage chassis 9 in a non-clamped state.

Figure 8:
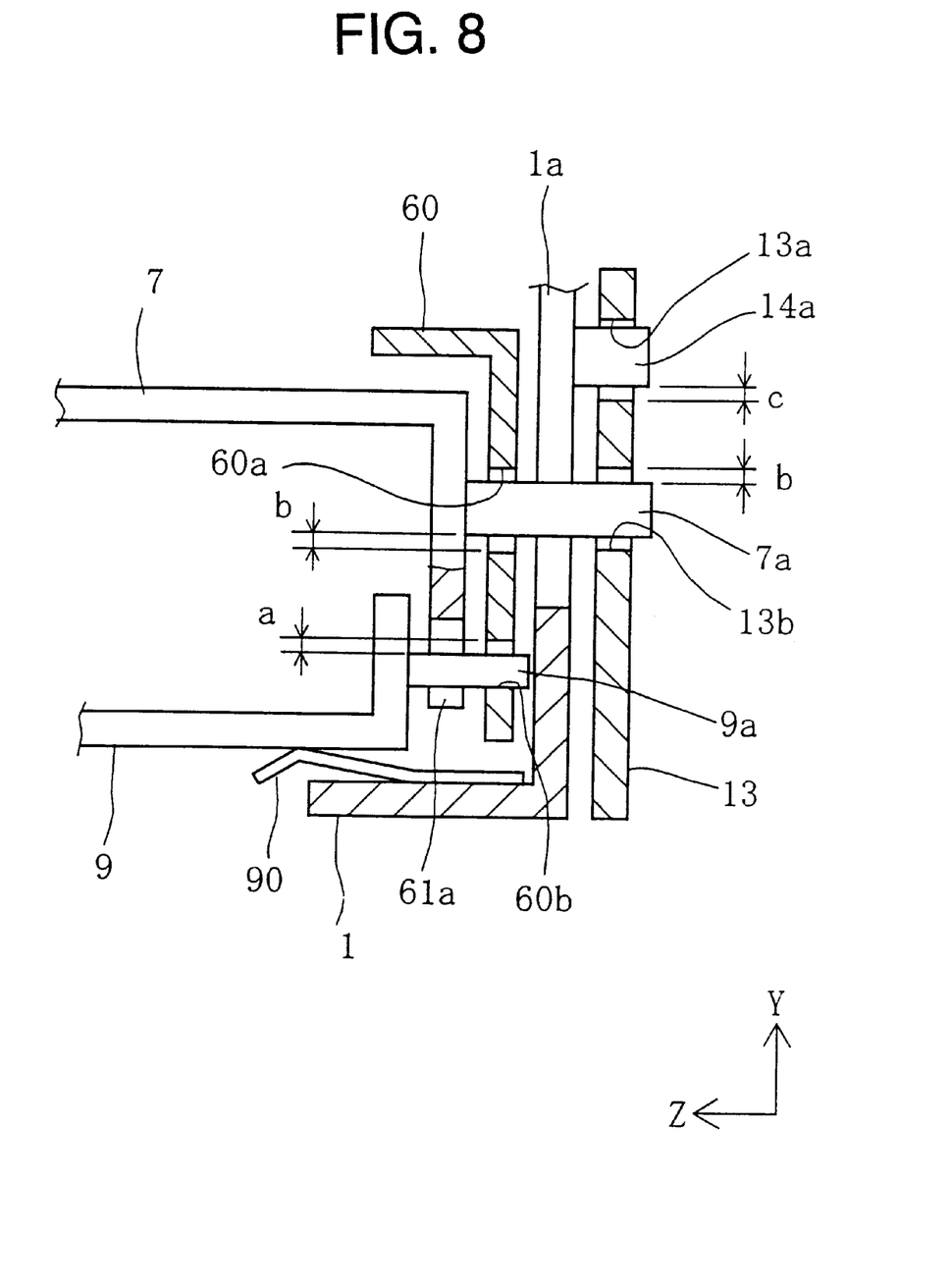
FIG. 8 is a vertical cross-sectional view showing a state in which the disc reproduction device is moved to a standby position by means of an elevation device.
Figure 9:
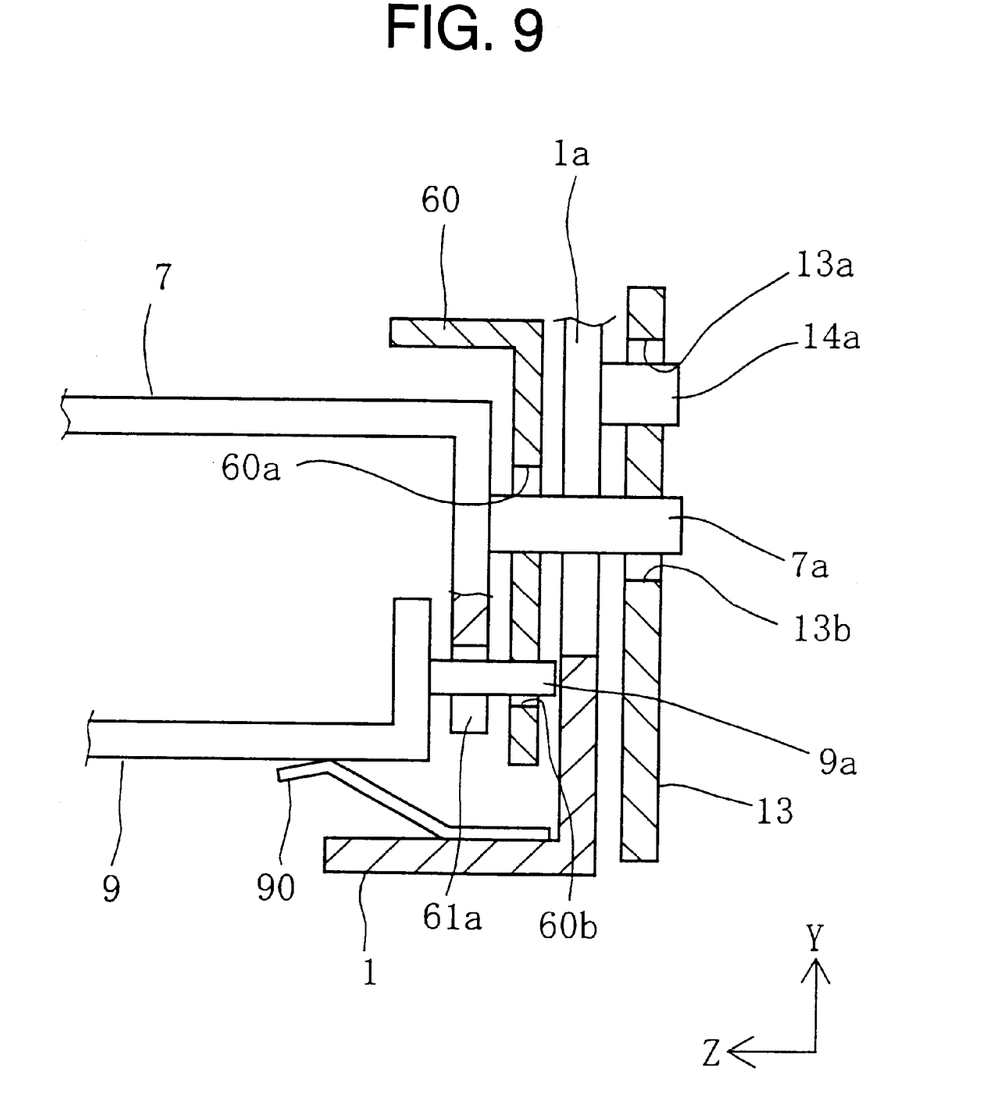
FIG. 9 is a vertical cross-sectional view showing a state in which an elastic force is applied to the disc reproduction device that has been moved to the standby position by means of the elevation device by means of a force application device.

As described above, when the magazine 2 is ejected out of the casing 1, the above disc reproduction device 3 vibrates under the influence of external vibration, and abnormal noise may be generated. The disc changer for preventing such vibration is provided on the bottom of the casing with an elastic member serving as a force application device, as shown in FIG. 8 and FIG. 9. The structure of the force application device and its operation will be described below with reference to FIG. 8 and FIG. 9.

The force application device is provided on each of the front and rear faces of the casing 1. Each of these devices has the same structure and function each other. Here, only the force application device provided at the front face will be described. The description of the force application device provided at the rear face is omitted.

As shown in FIG. 8, at the bottom face of the casing 1, there is provided a leaf spring 90 serving as an elastic member so as to come into contact with the bottom face of the carriage chassis 9 when the disc reproduction device 3 is moved to the standby position by means of the elevation device. When the disc reproduction device 3 is moved to the standby position so that the bottom face of the carriage chassis 9 comes into contact with the leaf spring 90. There is a predetermined clearance (a portion indicated by "a" shown in the figure) around a guide pin 9a, which is inserted into the cutouts 61a provided at the stage chassis 7 and the inclined hole 60b provided at the clamping lever 60 and fixed to the carriage chassis 9, within the cutout 61a and the inclined hole 60b as shown in the figure. In addition, there is also a predetermined clearance (a portion indicated by "b" shown in the figure) around a guide pin 7a, which is inserted into the guide hole 60a provided at the clamping lever 60, the guide hole 1a provided at the casing 1, and the inclined hole 13b provided at the elevation lever 13, and fixed to the stage chassis 7, within the guide hole 60a and the inclined hole 13b, as shown in the figure. Further, there is a predetermined clearance (a portion indicated by "c" shown in the figure) around a guide pin 14a, which is inserted into the guide hole 13a provided at the elevation lever 13, and projects from the casing 1, within the guide hole 13a, as shown in the figure.

When the disc reproduction device 3 moves to the standby position so that the bottom face of the carriage chassis 9 comes into contact with the leaf spring 90, the leaf spring 90 applies an elastic force to the carriage chassis 9 in a direction opposite to a direction in which the disc reproduction device 3 moves to the standby position (hereinafter, referred to the "force application direction") on the Y axis. As shown in FIG. 9, the carriage chassis 9 is lifted in the force application direction by means of the leaf spring 90. Thus, the clearance "a" shown in FIG. 8 is eliminated, and the guide pin 9a protruded from the carriage chassis 9 transmits the elastic force to the stage chassis 7 and clamping lever 60.

The stage chassis 7 and the clamping lever 60 to which the elastic force is applied by the leaf spring 90, are lifted in the force application direction. Thus, the clearance "b" shown in FIG. 8 is eliminated. Then, the guide pin 7a protruded from the stage chassis 7 transmits the elastic force to the elevation lever 13, and thus, the elevation lever 13 is lifted in the force application direction.

When the elevation lever 13 is lifted, the clearance "c" shown in FIG. 8 is eliminated, and the elastic force from the leaf spring 90 is transmitted to the casing 1 through the guide pin 14a.

In this way, when the disc reproduction device 3 is moved to the standby position by means of the elevation device, the leaf spring 15 provided at the bottom face of the casing 1 applies the elastic force to the bottom face of the carriage chassis 9 in the force application direction. Thus, each of the clearances "a", "b" and "c" described above is eliminated, and the stage chassis 7 and carriage chassis 9 are stationarily held on the casing 1.

In addition, when the disc reproduction device 3 is risen by means of the elevation device from this state so as to be set at the disc storage position for the discs stored in the disc storage device, the elastic force is released so that the clearances are kept in their original state.

In this way, when the magazine 2 is ejected out of the casing 1, the disc reproduction device 3 is moved to the standby position by means of the elevation device. Then, the stage chassis 7 and the carriage chassis 9 are stationarily held on the casing so that abnormal noise caused by external vibration can be prevented from being generated. In addition, only when the disc reproduction device 3 moves to the standby position, the elastic force is applied to the disc reproduction device 3. Thus, displacement between the disc storage position of the disc stored in the magazine 2 and the disc reproduction position of the disc reproduction device does not occur. In addition, there is no need to increase a driving force applied to the mechanism for transferring the disc.

The disc changer according to the present invention employs a structure in which, when the disc reproduction device is moved to the standby state by means of the elevation device, the elastic force is applied to the carriage chassis in the opposite direction to the movement direction by means of the force application device. Thus, the clearances between the carriage chassis or stage chassis and the casing can be eliminated by the elastic force, and the carriage chassis and the stage chassis can be stationarily held on the casing. Therefore, noise generation during ejection of the disc storage device can be prevented with a simple structure. In addition, there is provided the structure to apply the elastic force to the disc reproduction device only at the standby position. Therefore, an unexpected load is not applied to the mechanism for transferring the disc to the disc reproduction position of the disc reproduction device.

The entire disclosure of Japanese Patent Application No. 2000-093138 filed on Mar. 30, 2000 including the specification, claims, drawings and summary is incorporated herein by reference in its entirety.

What is claimed is:

1. A disc changer comprising:

a disc storage device capable of storing a plurality of discs to be arranged in a apparatus main body in a stacked state;

a disc reproduction device having a carriage chassis on which first components comprising a turn table and a pickup are mounted; and an elevation device capable of elevating said disc reproduction device in a stacking direction of the disc stored in said disc storage device, wherein, a force application device is provided at a position in abutment with said carriage chassis so as to apply force to said carriage chassis, when the disc reproduction device is moved to a standby position by said elevation device, said force being applied in a direction opposite to a movement direction of said disc reproduction device toward said standby position.

2. The disc changer according to claim 1, wherein said disc reproduction device has a stage chassis on which at least one second component comprising a clamper is mounted, and said disc reproduction device is stationarily held relative to said apparatus main body through transmission of said force caused by said force application device to said stage chassis, leading to application of said force to both of said carriage chassis and said stage chassis in the directions opposite to the movement direction of said disc reproduction device toward said standby position.

* * * * *